United States Patent [19]

Dobbins

[11] Patent Number: 4,817,010

[45] Date of Patent: Mar. 28, 1989

[54] VENDING MACHINE CONTROL WITH IMPROVED VENDOR SELECTOR SWITCH DETECTION AND DECODING APPARATUS

[75] Inventor: Bob M. Dobbins, Villanova, Pa.

[73] Assignee: Mars Incorporated, McLean, Va.

[21] Appl. No.: 20,690

[22] Filed: Mar. 2, 1987

[51] Int. Cl.[4] .......................... G06F 15/20; G06F 7/04

[52] U.S. Cl. .................................... 364/479; 194/217; 221/9; 340/825.35; 341/25

[58] Field of Search ............... 364/479, 478, 482, 484; 340/365 C, 365 R, 365 S, 365 E, 825.35; 235/381; 221/2, 4, 6, 9; 222/52; 194/216-218, 239, 240

[56] References Cited

U.S. PATENT DOCUMENTS

| | | | |
|---|---|---|---|
| 2,365,566 | 12/1944 | Langer . | |
| 2,497,661 | 2/1950 | Dome . | |
| 2,701,279 | 2/1955 | Lovell et al. . | |
| 3,115,803 | 12/1963 | Pedicano . | |
| 3,140,358 | 7/1964 | Martens . | |
| 3,304,612 | 2/1967 | Proctor et al. . | |
| 3,676,607 | 7/1972 | Nash et al. . | |
| 3,691,555 | 9/1972 | Looschen . | |
| 3,721,976 | 3/1973 | Kuijsten . | |
| 3,742,137 | 6/1973 | Garland . | |
| 3,798,370 | 3/1974 | Hurst . | |
| 3,803,592 | 4/1974 | Hatley . | |
| 3,908,100 | 9/1975 | Richard et al. . | |
| 3,921,165 | 11/1975 | Dym . | |
| 3,928,789 | 12/1975 | Elias . | |
| 3,952,288 | 4/1976 | Carpenter et al. . | |
| 3,953,846 | 4/1976 | Ekeland . | |
| 3,983,553 | 9/1976 | Kesling . | |
| 3,988,701 | 10/1976 | Funston . | |
| 4,015,254 | 3/1977 | Strandt . | |
| 4,078,257 | 3/1978 | Bagley . | |
| 4,103,252 | 7/1978 | Bobick . | |
| 4,125,783 | 11/1978 | Sefton | 340/365 C |
| 4,164,622 | 8/1979 | Pobgee . | |
| 4,179,748 | 12/1979 | Brown et al. . | |
| 4,225,056 | 9/1980 | Flubacker . | |
| 4,231,105 | 10/1980 | Schuller et al. . | |
| 4,233,660 | 11/1980 | Fagan . | |
| 4,241,333 | 12/1980 | Giebler et al. . | |
| 4,266,118 | 5/1981 | Takase et al. . | |
| 4,284,208 | 8/1981 | Levasseur . | |
| 4,305,065 | 12/1981 | Mogi . | |
| 4,319,078 | 3/1982 | Yokoo et al. . | |
| 4,328,539 | 5/1982 | Heeger . | |
| 4,336,529 | 6/1982 | Buan . | |
| 4,354,613 | 10/1982 | Desai et al. . | |
| 4,372,464 | 2/1983 | Otten . | |
| 4,374,384 | 2/1983 | Moates . | |
| 4,377,049 | 3/1983 | Simon et al. | 340/365 C |
| 4,381,835 | 5/1983 | Shah et al. . | |
| 4,415,781 | 11/1983 | Frame et al. . | |
| 4,429,301 | 1/1984 | Crumley et al. . | |
| 4,435,616 | 3/1984 | Kley . | |
| 4,440,990 | 4/1984 | Nozaki . | |
| 4,458,187 | 7/1984 | Heiman . | |
| 4,481,590 | 11/1984 | Otten . | |
| 4,495,485 | 1/1985 | Smith . | |
| 4,498,570 | 2/1985 | King et al. . | |
| 4,544,923 | 10/1985 | Blatter et al. . | |
| 4,555,693 | 11/1985 | Danish et al. . | |
| 4,567,469 | 1/1986 | Danish et al. . | |
| 4,575,714 | 3/1986 | Rummel | 364/482 |
| 4,583,189 | 4/1986 | Koyama . | |
| 4,593,361 | 6/1986 | Otten . | |
| 4,616,213 | 10/1986 | Danish . | |
| 4,616,213 | 10/1986 | Danish . | |
| 4,706,794 | 11/1987 | Awane et al. | 364/479 |

OTHER PUBLICATIONS

IBM Technical Disclosure Bulletin, vol. 14, No. 8, Jan. 1972, J. L. Holt & L. S. Rogers—Keyboard Using Elastic Diaphram Switches.

*Primary Examiner*—Joseph Ruggiero

*Attorney, Agent, or Firm*—Davis Hoxie Faithfull & Hapgood

[57] ABSTRACT

A vending machine control with an improved vendor selector switch detection and decoding circuit is described which detects and decodes the closure of selector switches in a vending machine utilizing a low cost decoding arrangement. Each selector switch is associated with a corresponding impedance in a keyboard network so that a unique impedance is presented on a keyboard decode line from the keyboard network. Decode circuitry and a decode algorithm are also disclosed for a period based decoding scheme which compensates for various tolerances and environmental affects.

17 Claims, 4 Drawing Sheets

VENDING MACHINE CONTROL WITH IMPROVED VENDOR SELECTOR SWITCH DETECTION AND DECODING APPARATUS

BACKGROUND OF THE INVENTION

1. Field of the Invention

This invention relates generally to control apparatus for controlling the operation of vending machines, and particularly to such control apparatus having an improved detection and decoding arrangement for detecting the operation of vending machine switches, such as product selection switches, a coin return switch or any other vending machine operation controlling or detecting switch typically found in a vending machine.

2. Description of the Prior Art

Many vending machines employ a control circuit including a programmed microprocessor or microcomputer for purposes of controlling their operation. See, for example, the disclosure of U.S. Pat. No. 4,458,187 which is assigned to the assignee of the present invention and which is incorporated herein by reference. During the operation of such control circuits, it is necessary to detect and decode the closing of a number of switches as a result of a customer's usage of the vending machine or the resultant operation of the vending machine in response to the customer's usage. For example, when a customer wishes to select an item in a vending machine, he typically inserts coins equal to or exceeding the price of the item and then presses one or more selection buttons corresponding to the item. The vending machine compares the customer's credit with the price of the item selected, and if the credit is equal to or greater than the price, causes a dispensing means, such as a vend motor, to cause the selected item to be dispensed to the customer. If the customer's credit exceeded the price of the item, the difference is typically returned to the customer from a supply of coins maintained in the vending machine for purposes of making change.

Switches either are or may be employed in a large variety of the above operations. By way of example, switches may be involved in the detection and crediting of the customer's insertion of coins into the vending machine. When a customer operates a selection button, a corresponding selection switch is closed. Switches may be employed to detect the operation of a vend motor, to determine if a vend motor is operating properly, to ascertain if a product is sold out or to ascertain that a product has been delivered to the customer. Additional switches may be used to monitor the supply of change coins or to monitor the actual delivery of change to the customer. In order to function, a vending machine must be able to detect the closure of any of the above switches which it employs, and to identify which switch has closed once closure is detected.

By way of example, a number of prior art arrangements are known for detecting and decoding the selector switches of a vending machine. U.S. Pat. No. 4,593,361 shows a capacitive touch panel including eight capacitive touch switches each of which is connected to a corresponding input of a shift register. Serial data from this shift register is entered into a second shift register before being transferred to a central processor. A selection switch subroutine determines if a vend selection has been made.

U.S. Pat. No. 4,354,613 describes a selection switch arrangement in which one selection switch is provided for each item to be vended. A plurality of selection buttons corresponding to the selection switches are arranged in rows and columns. A line for each row and a line for each column is used in decoding a selection button which has been actuated. Similarly, U.S. Pat. Nos. 4,233,660 and 4,225,056 describe a keyboard matrix of product selection push-button switches which are sequentially interrogated by a control microprocessor by sequential energization and interrogation of row and column lines. U.S. Pat. No. 4,231,105 also illustrates a matrix arrangement of selection switches and price setting switches.

It is seen that a variety of keyboard decoding systems have been put to use in the vending field over the years. The cost effectiveness of any keyboard decoding system is dependent on several parameters including: the cost of the keypad or switches employed; the number of lines required to decode the number of switches employed; the cost of the support hardware to decode the switches; the number of lines required by the decode hardware to output the decoded switch data; and the physical size of the decode hardware. The prior art relating to vending describes various schemes to optimize one or two of the elements listed above, but none is optimal from the point of view of all five listed parameters. This is true despite the fact that a wide variety of keyboards and keypads have long been available from manufacturers of such items.

For example, for decoding a number of keys M, keyboards and keypads are available that provide a common line to the M keys to be decoded and a separate line to each of the M keys. Thus, this decoding arrangement has M+1 lines to the keyboard. The decode hardware consequently requires M input lines (the one per key) and typically will have a binary output which requires $\log_2 M$ (rounded up to the nearest whole number) lines out. The costs of a binary decoder, the input/output (I/O) lines to the processing device, and the required physical space for these components are high.

Keyboards which use fewer lines to control more keys are also available. An example is a matrix construction in which the depression of a key switch causes two outputs, one representing the row of the switch and one representing the column of the switch. The number of required lines to the keyboard therefore is X+Y where X represents the number of rows of key switches and Y represents the number of columns of key switches. The total number of lines X+Y can be significantly less than the number of lines required in the scheme described in the immediately preceding paragraph. The total number of lines, however, will be a function of the setup of the matrix. In other words, a 4×4 matrix will have 16 switches, as will an 8×2 matrix of switches; however, the first scheme uses 8 decode lines, and the latter uses 10 lines. While a matrix arrangement has obvious benefits, the number of lines required by its decode hardware is typically very high and therefore costly.

Other keyboard arrangements have an encoded output such as that in a 2 of N decode arrangement. In this decode scheme, each switch depression results in three contacts being made. One of these contacts is always grounded. The other two contacts are only grounded when the switch is depressed. The output lines therefore give two lines low in addition to the ground line for each switch depression. The number of switches M which can be decoded using N lines plus a common line in this scheme is $M=(N)(N-1)/2$. Thus, with 7 lines and 1 common line, 21 switches can be decoded $$\frac{(7)(7-1)}{2} = 21.$$

or, in other words, 7 lines in combination of 2 is $(7\times6)/2=21$ switches which can be decoded allowing for one common line. This scheme has advantages over the previously described schemes, but it still requires a significant number of lines in the decode hardware used to decode the switches, and requires relatively expensive switches.

Finally, a variety of switch decoding arrangements making use of resistive or capacitive networks so that switch decoding can be achieved with a reduced number of lines have been described in nonvending contexts. See, for example, U.S. Pat. Nos. 4,015,254, 4,415,781, 4,429,301 and 4,495,485.

SUMMARY OF THE INVENTION

The present invention addresses longstanding problems in the vending field in a low cost fashion, and provides an improved low cost arrangement for decoding vending machine switches that have been activated. By way of example, vending machine keyboard selection switches are decoded with apparatus according to one embodiment of the present invention with only two lines going to the keyboard and only one line going to the decode hardware for purposes of decoding an actuated key.

Details of my invention are set forth below and further advantages will be apparent therefrom:

DETAILED DESCRIPTION

Figure 1:
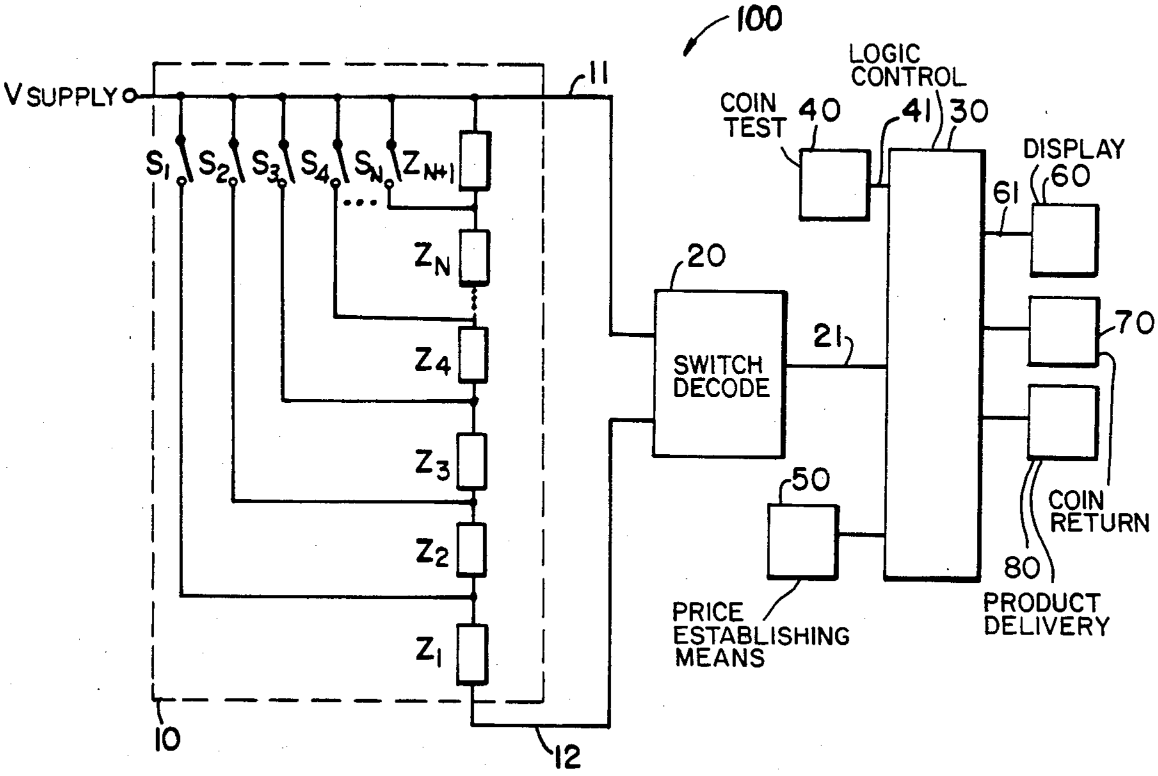
FIG. 1 is a schematic block diagram of a vending machine with control apparatus according to the present invention.

FIG. 1 is a schematic block diagram of a vending machine 100 including a keyboard network 10 having a voltage supply line 11 connected to $V_{supply}$ and a keyboard decode line 12 connected to a switch decode means 20. As shown in FIG. 1, $V_{supply}$ is connected directly via line 11 to switch decode means 20; however, in other embodiments, some other provision for providing voltage to decode means 20 might be made so that only a single output line would connect keyboard network 10 to decode means 20 thereby achieving the minimum number of decode lines. The switch decode means 20 has a single output line 21 connected to a logic control means 30. The logic control means 30 is also connected to a plurality of vending machine means for controlling subfunctions of the vending machine 100. As shown in FIG. 1, these means include a coin test means 40, a price establishing means 50, a display means 60, a coin return means 70 and a product delivery means 80. While these particular means for controlling subfunctions of a vending machine are shown for exemplary purposes, other such means found in typical vending machines are contemplated, and could readily operate in conjunction with logic control means 30 and the present invention. Further, each means for controlling subfunctions is shown for simplicity connected to microprocessor 30 by a single connecting line; however, a number of connections between each means and microprocessor 30 will normally exist. The actual number of connections will depend on the components employed in the vending machine and its control.

Logic control means 30 will typically be a suitably programmed microprocessor or microcomputer such as an Intel 8051 chip. Logic control means 30 controls the overall operation of the vending machine 100. The overall operation of microprocessor controlled vending machines is generally well known to men of ordinary skill in the art. See, for example, U.S. Pat. Nos. 4,593,361, 4,498,570, 4,481,590, 4,458,187, 4,372,464, 4,354,613, 4,328,539, 4,233,660, 4,231,105 and 4,225,056. Consequently, such operation will only be briefly described.

When a customer inserts a coin into the vending machine 100, the coin test means 40 tests the coin for validity and denomination and produces a signal on a line (or lines) 41 which connects the coin test means 40 to the logic control means 30. As additional coins are inserted, the customer's credit is determined, and logic control means 30 produces a signal on line (or lines) 61 causing display means 60 to display the customer's credit.

When the customer has adequate credit to make a selection, he can use the keyboard network 10 to make a selection. Once a selection has been made, the logic control means 30 determines the price for the selection from the price setting means 50, compares the price with the customer's credit and instructs the product delivery means 80 to deliver the selected product. If the customer's credit had been inadequate, the logic control means 30 would cause display means 60 to indicate that the credit was insufficient or to make another selection. The customer could then try another selection at a lower price or use coin return means 70 to obtain a refund of his money. Such overall operation, with the exception of the selection switch detection and decoding which is to be described in detail below, is generally well known.

As shown in FIG. 1, the keyboard network 10 of that figure is connected by only two wires, one of which is the voltage supply line 11 to the switch decode means 20. The keyboard network 10 preferably comprises a keypad or keyboard arrangement consisting of both an array of switches $S_1$, $S_2$, $S_3$, $S_4$ . . . , and $S_N$, where N is the total number of selection switches, and impedances $Z_1$, $Z_2$, $Z_3$, $Z_4$ . . . , and $Z_{N+1}$ connected to the switches such that each switch is electrically related to at least one of the impedances. More particularly, as shown in FIG. 1, one contact of each of the selection switches, $S_1$, $S_2$ . . . $S_N$ is connected by voltage supply line 11 to $V_{supply}$. The impedances $Z_1$, $Z_2$ . . . $Z_N$ are connected to one another in series between voltage supply line 11 and the keyboard decode line 12. The other contact of each of the switches $S_1$, $S_2$ . . . $S_N$ is connected between the correspondingly numbered impedance and the next higher numbered impedance. For example, the switch $S_1$ is connected between the impedances $Z_1$ and $Z_2$ and the switch $S_N$ is connected between the impedances $Z_N$ and $Z_{N+1}$. In a preferred embodiment which will be described in greater detail in connection with FIG. 4, the impedances are series connected resistors having the same nominal resistance. Depending on the switch depressed, a unique resultant equivalent impedance, $Z_{keyboard}$, is presented on keyboard decode line 12 and thereby connected to decode means 20. For example, when switch $S_1$ is closed, the impedance presented on line 12 and measured by decode means 20 is substantially $Z_1$. If switch $S_4$ is closed, the measured impedance is substantially $Z_1+Z_2+Z_3+Z_4$. This measured impedance is unique for each depressed switch. Decoding of this impedance is done by the switch decode means 20 and the logic control means 30. The switch decode means 20 is preferably an impedance to frequency converter which will produce on a single switch decode line 21 a signal having a frequency indicative of the impedance connected to it by keyboard decode line 12. As will be discussed further below in connection with FIGS. 4 and 5, the signal on switch decode line 21 is used by logic control means 30 to determine which of the selector switches has been closed.

The interconnection of selection switches and impedances can be accomplished in many ways dependent on the overall system's requirements. In FIG. 1, the switches are interconnected such that the decoder output will indicate the switch depression of the switch with greatest priority. The priority as shown in FIG. 1 is S1, S2, S3, . . . $S_N$ with switch $S_1$ having the highest priority and switch $S_N$ having the lowest priority. In other words, if switch $S_1$ is depressed, then switches with lower priority than $S_1$ will be shorted by $S_1$ and will appear transparent if depressed at the same time. Only switch $S_1$ will be decoded as only its impedance $Z_1$ will be connected to the switch decode means 20. With apparatus as shown in FIg. 1, two switches depressed at the same time will result in the decode of the switch with the higher priority. With the present invention, attempted cheating by quickly depressing multiple switches will only be seen by logic control means 30 as a correct decode of one switch. Further, this scheme can be implemented with resistors that are equal in value and relatively low in value allowing for a high level of noise immunity and easy fabrication.

Figure 2:
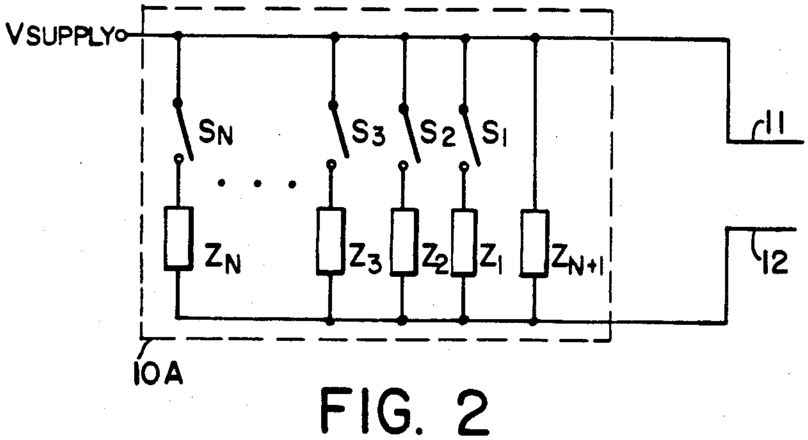
FIG. 2 is a schematic of an alternative keyboard network for use in apparatus according to the present invention.
Figure 3:
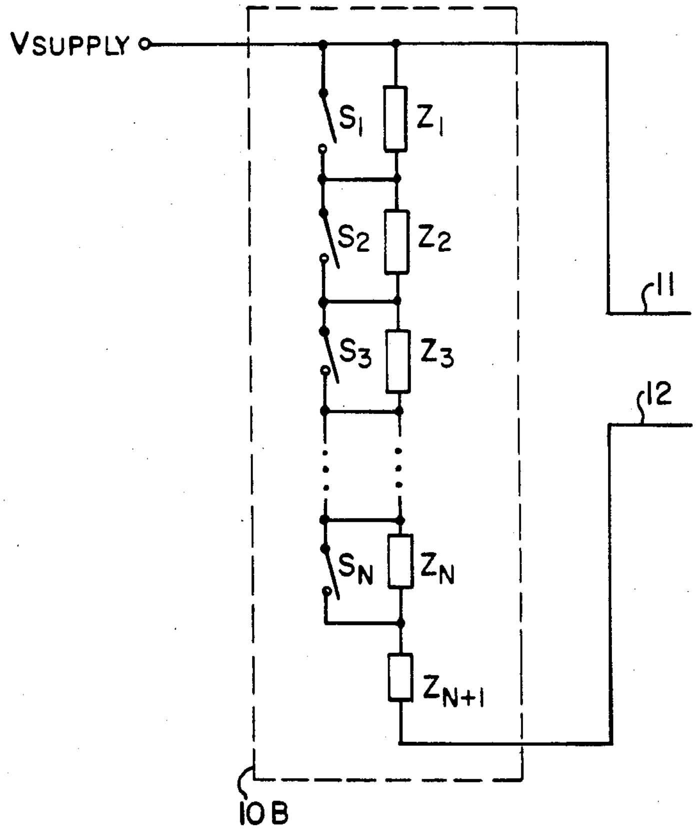
FIG. 3 is a schematic of another alternative keyboard network for use in control apparatus according to the present invention.

The schematics of FIGS. 2 and 3 demonstrate second and third keyboard networks 10A and 10B which like the network 10 consist of the interconnection of a plurality of switches $S_1$, $S_2$, $S_3$, . . . $S_N$ and impedances $Z_1$, $Z_2$, $Z_3$ . . . $Z_N$. Unlike keyboard network 10, if properly designed, keyboard networks 10A and 10B allow decoding of simultaneous multiple switch closures.

More particularly, in network 10A of FIG. 2, each switch is connected in series with its correspondingly numbered impedance in a switch-impedance pair. For example, switch $S_1$ is connected in series with impedance $Z_1$ and switch $S_N$ is connected in series with impedance $Z_N$. All of the switch-impedance pairs are connected in parallel between lines 11 and 12. Finally, impedance $Z_{N+1}$ is also connected in parallel with the switch-impedance pairs between lines 11 and 12.

In the keyboard network 10B of FIG. 3, each switch is connected in parallel with its correspondingly numbered impedance in a switch-impedance pair. For example, switch $S_1$ is connected in parallel with impedance $Z_1$ and switch $S_N$ is connected in parallel with impedance $Z_N$. All of the switch-impedance pairs are connected together in series and in series with impedance $Z_{N+1}$ between lines 11 and 12. In the keyboard networks 10A and 10B shown in FIGS. 2 and 3 respectively, the impedances can be selected to provide a decode impedance unique to each switch and fmultiple switch closure thereby allowing an illegal decode for multiple switch depressions which are detected, or alternatively, allowing a multiple switch closure to be recognized for some other purpose such as changing the mode of operation from an operational mode to a service mode, for price setting, or for some other function. This latter alternative is particularly important where cost factors dictate that a minimum total number of switches be employed. The configurations shown in FIGS. 2 and 3 generally require non-equal impedances and care is required to prevent the parallel combinations in FIG. 2 or series combinations in FIG. 3 from resulting in an equivalent impedance occurring for more than one switch depression or combination of switch depressions.

In each of the keyboard networks 10, 10A and 10B of FIGS. 1, 2 and 3, it is noteworthy that there exists an impedance between the lines 11 and 12 even if all switches are open or closed. This impedance provides a reference impedance at all times. Since the location of the reference impedance will be representative of the physical location and therefore the emvironment of the other impedances in the keyboard network, it can be used to calibrate the keyboard decoding system. That is, a reference output will be produced on switch decode line 21 by the switch decode means 20 at all times. This output can be used by the logic control means 30 to establish a reference point from which relative measurements of decoded switch outputs can be made. This arrangement allows for the provision of compensation for temperature, humidity, aging of components and other environmental changes experienced by the vending machine and its control apparatus. Further, the tolerance of any impedance against its nominal value can be compensated for so long as the relative tolerances between impedances on the keyboard are close. Typically, resistors formed by the same process at approximately the same time will vary from their nominal resistance in a similar fashion. For example, where resistors are formed as part of a membrane switch package by screening on carbon ink, all the resistors will tend to vary high or low in about the same way. Consequently, the absolute impedance, keyboard to keyboard is not critical, only the relative tolerance between the impedances employed on a particular board is critical. Hence, this arrangement allows compensation not only for environmental changes but also for manufacturing process changes.

Figure 4:
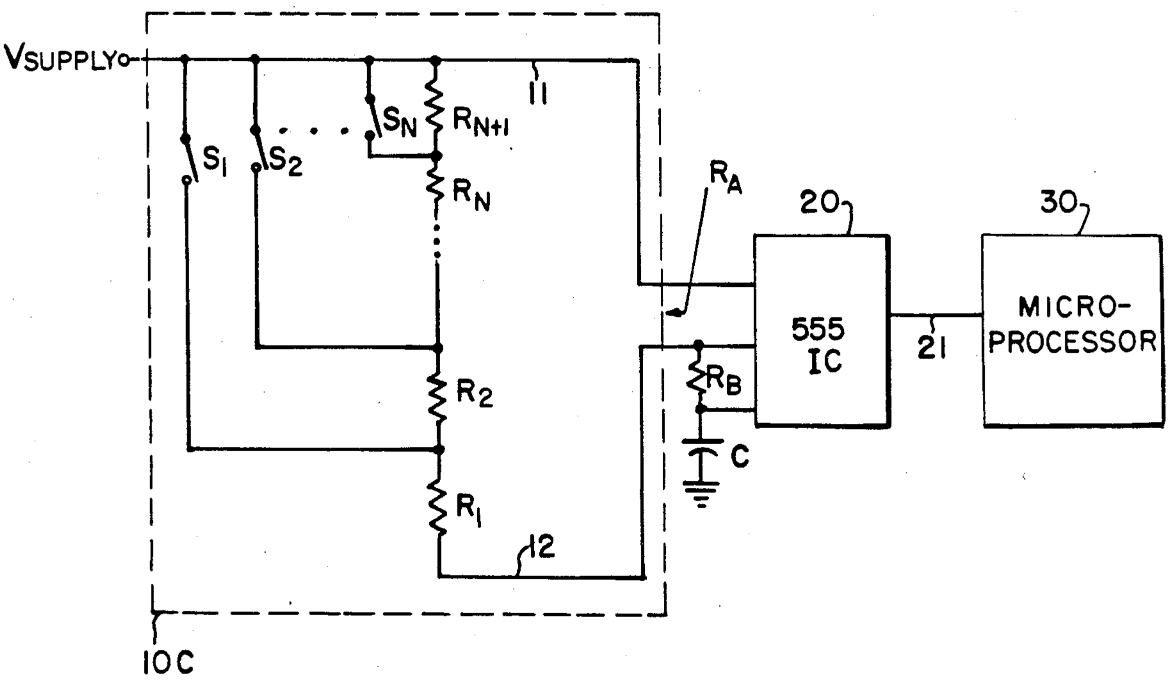
FIG. 4 is a schematic of a preferred embodiment of control fapparatus according to the present invention.

FIG. 4 shows a preferred embodiment of the present invention. In this embodiment, the impedances $Z_1$ to $Z_{N+1}$ of FIGS. 1-3 have been replaced with resistors $R_1$ to $R_{N+1}$. The resistors $R_1$ to $R_{N+1}$ in the presently preferred embodiment have the same nominal value of 2800 ohms with a 5% tolerance, the number of keyboard switches is 21, N=21, and the number of keyboard network resistors is 22, N+1=22. These resistors are connected to switches $S_1$ to $S_N$, $V_{supply}$, and lines 11 and 12 to form a keyboard network 10C in just the same way that the impedances $Z_1$ to $Z_{N+1}$ were connected to the correspondingly labeled components to form the keyboard network 10 of FIG. 1 which was discussed in detail above.

The switch decode means 20 is an impedance to frequency converter designed using a 555 timer such as the NE555 chip from Texas Instruments configured as an astable multivibrator. More specifically, the type 555 IC is connected to the keyboard decode line 12 as follows. Keyboard decode line 12 is connected to a first terminal of a resistor $R_B$ and to an input of the 555 IC. A second terminal of the resistor $R_B$ is connected both through a capacitor C to ground and directly to another input of the 555 IC. As shown in FIG. 4, the keyboard network 10C presents an equivalent resistance $R_A$ which varies depending upon which switch or switches of the plurality of switches $S_1$ to $S_N$ have been closed. The values of the equivalent resistance $R_A$, the resistor $R_B$ and the capacitor C determine the frequency of the output signal produced by the 555 IC. As the resistor $R_B$ and the capacitor C are fixed in value, it is seen that the frequency of the output signal produced by the 555 IC will vary as the equivalent resistance $R_A$ varies. In the preferred embodiment, suitable values for the resistor $R_B$ and capacitor C are 720 ohms and 0.1 microfarads respectively. The output signal from the 555 IC is connected by switch decode line 21 to logic control means 30 which in this preferred embodiment is a suitably programmed Intel 8051 microprocessor chip programmed in accordance with the flowchart of FIG. 5 for purposes of switch closure detection and decoding.

The microprocessor 30 measures the period T of the signal from the 555 IC. The period T of this signal is the inverse of its frequency (1/f). An analysis of this circuit will show that for equal resistors $R_1$ through $R_{N+1}$, an equal increment in period will be measured by the microprocessor 30 as the switches $S_1$ through $S_N$ are closed in priority order.

In the preferred embodiment shown in FIG. 4 the logic control means 30 establishes a reference period which is the inverse of the output frequency $F_o$ on line 21 when all switches are open:

$$F_o = \frac{1}{T_o} = \frac{1.44}{(RA_o + 2RB)C}$$

where $RA_o$ is the equivalent resistance $R_A$ measured when all switches are open. Therefore, $$RA_o = R_1 + R_2 + \ldots + R_N + R_{N+1} = \sum_{x=1}^{N+1} R_x.$$

$T_o$ can then be calculated to be:

$$T_o = \frac{\left(\sum_{x=1}^{N+1} R_x + 2RB\right)C}{1.44}$$

The value $T_o$ is measured by the microprocessor 30 and saved as a reference value. It will be seen from the above equation that all values of T will be proportional to $RA_o$ and provided all the components of $RA_o$, i.e., R1, R2 . . . $R_{N+1}$ are equal, T will be linearly proportional to $R_A$. Further, a step change period value, ΔT, can be determined where $\Delta T = T_o - T_N$ where $T_N$ is the period measured or calculated with switch N depressed. For adjacent switch depressions, the difference between the measured periods will be equal to ΔT subject to tolerance variations. Thus, a simple decode algorithm is possible whereby $T_o$ is measured by the microprocessor when all the switches $S_1 \ldots S_{N+1}$ are open. ΔT is then calculated by dividing $T_o$ by the number of resistors, N+1, and saved in memory by the microprocessor. By knowing the number of switch elements in a particular system, a simple decode method can be implemented. One such method is shown in the flowchart of FIG. 5.

Figure 5:
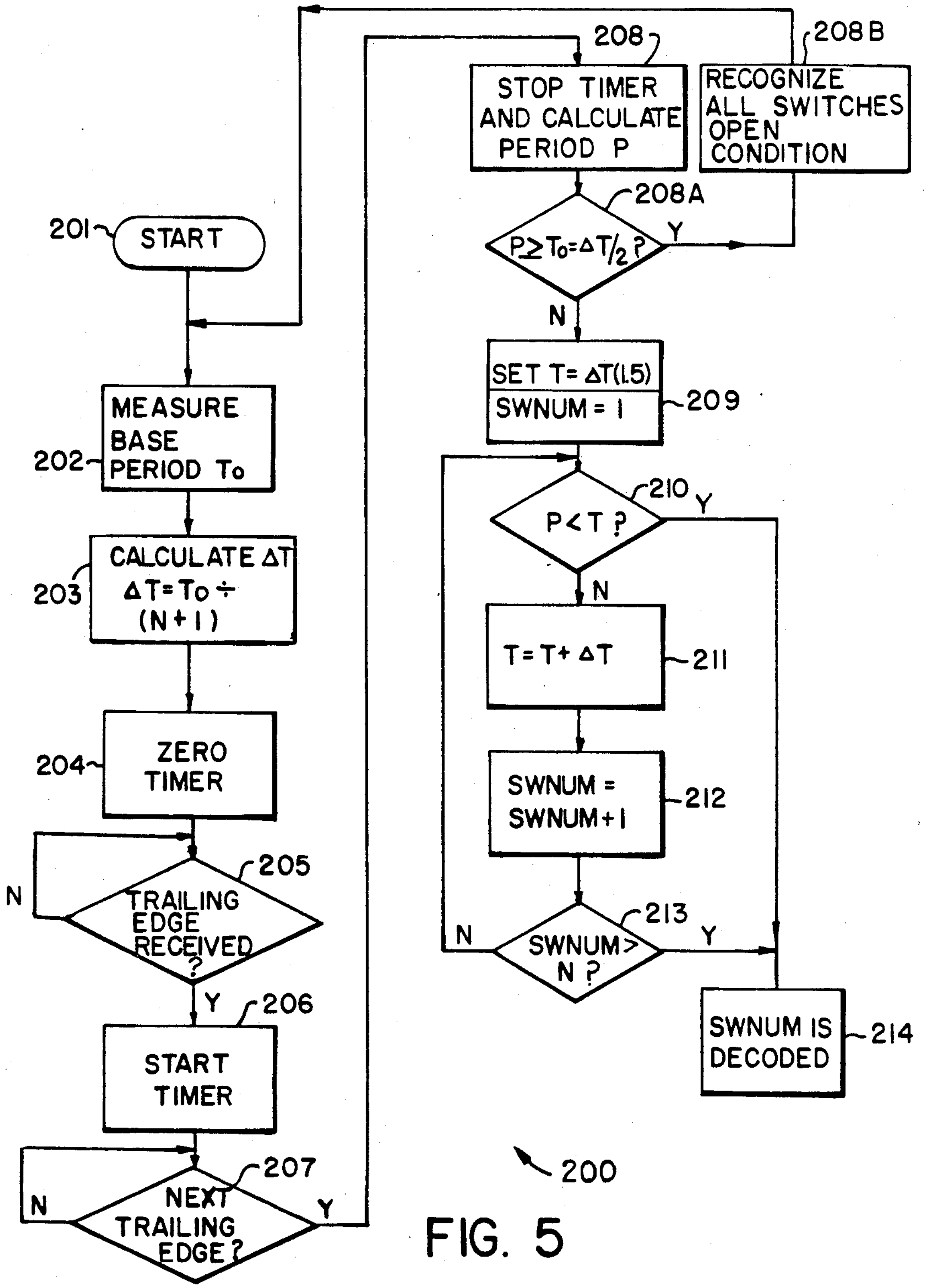
FIG. 5 is a flowchart for decoding switch closures in the switch arrangement shown in FIG. 4.

The flowchart 200 of FIG. 5 is preferably implemented as a software program for a microprocessor such as the microprocessor 30 of FIG. 4. Such a program could take a variety of implementations and could be readily written by one of ordinary skill in the art based upon the flowchart 200 of FIG. 5. Flowchart 200 begins with a start block labeled 201 which might typically be the beginning of a subroutine in an overall program for controlling the operation of the vending machine 100. For purposes of discussion, it will be assumed that initially all the switches are open and remain open until the discussion indicates otherwise. Proceeding to the second block labeled 202, microprocessor 30 then measures and stores the base period for all switches open, $T_o$. As discussed above, the base period, $T_o$, is the inverse of the frequency, $F_o$, of the output signal from decode means 20 when all the switches $S_1, \ldots S_N$ are open. Having measured and stored $T_o$, the microprocessor 30 proceeds to block 203 of flowchart 200 and calculates and stores, a step change period value ΔT by effectively dividing the base period, $T_o$, by the number of resistors, N+1. Because it is electronically possible to perform division by N+1 in a number of ways, for example, by subtracting 1 unit N+1 times, the present invention contemplates such alternatives for effectively achieving a substantially similar result based upon calculation of reference and step change period values.

Returning to flowchart 200, at block 204, microprocessor 30 zeroes an internal timer connected to the output from the decode means 20. Preferably, this internal timer is triggered by the trailing edge of pulses it receives, and consequently, at block 205, microprocessor 30 determines if a trailing edge has been received. If a trailing edge has not been received, the microprocessor 30 waits a very short period of time relative to the period of any signal connected to the internal timer, and then checks again to see if a trailing edge is detected. This process is reiterated until a trailing edge is detected, and then microprocessor 30 proceeds to block 206 of the flowchart 200. At this point, the internal timer is started. The timer runs until the next trailing edge is received. Detection of a second or next trailing edge is controlled by block 207 similar to detection of the first or preceding trailing edge in block 205. Upon detection of the next trailing edge, the timer is stopped at block 208, and the period, P, is calculated. It should be readily apparent that the period P is the time which the timer has run between occurrences of trailing edges.

At blocks 208A and 208B, microprocessor 30 determines if the measured period P is indicative of the all switches open condition. To do this, the microprocessor 30 first computes a value equal to the difference between the stored base period, $T_o$, and the stored step change period value divided by two (ΔT/2), $T_o - \Delta T/2$. Microprocessor 30 then determines if the period P is greater than or equal to this value, $P \geqq T_o - \Delta T/2$?

Since for our example, it was assumed that all switches are open and remain open, the measured period P would in fact be substantially equal to the base period $T_o$ and consequently would be greater than the difference value, $T_o-\Delta T/2$. Thus, microprocessor 30 would proceed to block 208B where the microprocessor recognizes the all switches open condition, and loops back to block 202. Microprocessor 30 will continue to loop as described above until a switch is closed. Now assuming switch $S_2$ has been closed when microprocessor 30 again reaches block 208A, the period P will no longer be greater than or equal the difference $T_o-\Delta T/2$. Consequently, microprocessor 30 proceeds to block 209. At block 209, the microprocessor 30 computes an arbitrary value, T, based on the step change period value $\Delta T$ which was previously calculated at block 203. In the presently preferred embodiment, the value T is computed as one and one-half times the step change period value $\Delta T$, $T=1.5\Delta T$. Also at block number 209, a switch number variable SWNUM is set equal to one, SWNUM=1.

Proceeding to block 210, microprocessor 30 compares the period P to see if it is less than the value T. In the present example, we have now assumed that the switch $S_2$ is closed. Consequently, the resistance seen at line 12 is the sum of the resistances of resistors $R_1$ and $R_2$, $R_1+R_2$, and the period P expressed in terms of the step change period value $\Delta T$ is approximately $2\Delta T$. Therefore, the period P is not less than the value T which equals $1.5\Delta T$. Thus, microprocessor 30 proceeds to block 211 of flowchart 200, and increments the value T by the step change period value T, $T=T+\Delta T$. At block 212, the switch number variable SWNUM is also incremented by one, SWNUM=SWNUM+1. At block 213, microprocessor 30 determines if the switch number variable SWNUN is greater than the number of switches N, SWNUM>N? If it is, then the microprocessor 30 proceeds to block 214 and decodes the switch number variable SWNUM as indicative that the switch $S_N$ is closed. If SWNUM is not greater than N, as it will not be for the present example, microprocessor 30 loops back to block 210 and this loop continues until the switch number variable SWNUM is decoded at block 214. For our example of switch $S_2$ closed, the switch number variable is decoded as 2 on this pass through the loop. Once SWNUM is decoded at block 214, the overall control program for vending machine 100 proceeds to utilize the decoded information just as it would utilize decode information from other decoding arrangements.

The fundamental limitation of the number of switches which can be decoded by apparatus according to the present invention is a function of the tolerances of the impedances on the keyboard. A secondary limitation is the range of output frequencies produced by decode means 20 and the ability of the logic control means 30 to decode them. In particular, high frequencies may approach the limit of a decoding device such as microprocessor 30. The first limitation can be shown statistically to range from 100 switches when 5% tolerance resistors are used to 2500 switches when 1% tolerance resistors are used. These numbers assume a normal distribution of component tolerances and a 0.27% error in decode rate if the full switch capacity is used. The second limitation is determined by the operating frequency range of the decoding device.

In a typical vending application, 21 selection switches are required. This number is well away from either of the above limitations of the present invention, and the decoding capacity of the present invention is far in excess of the capabilities of the prior art relative to the number of lines required.

Figure 3A:
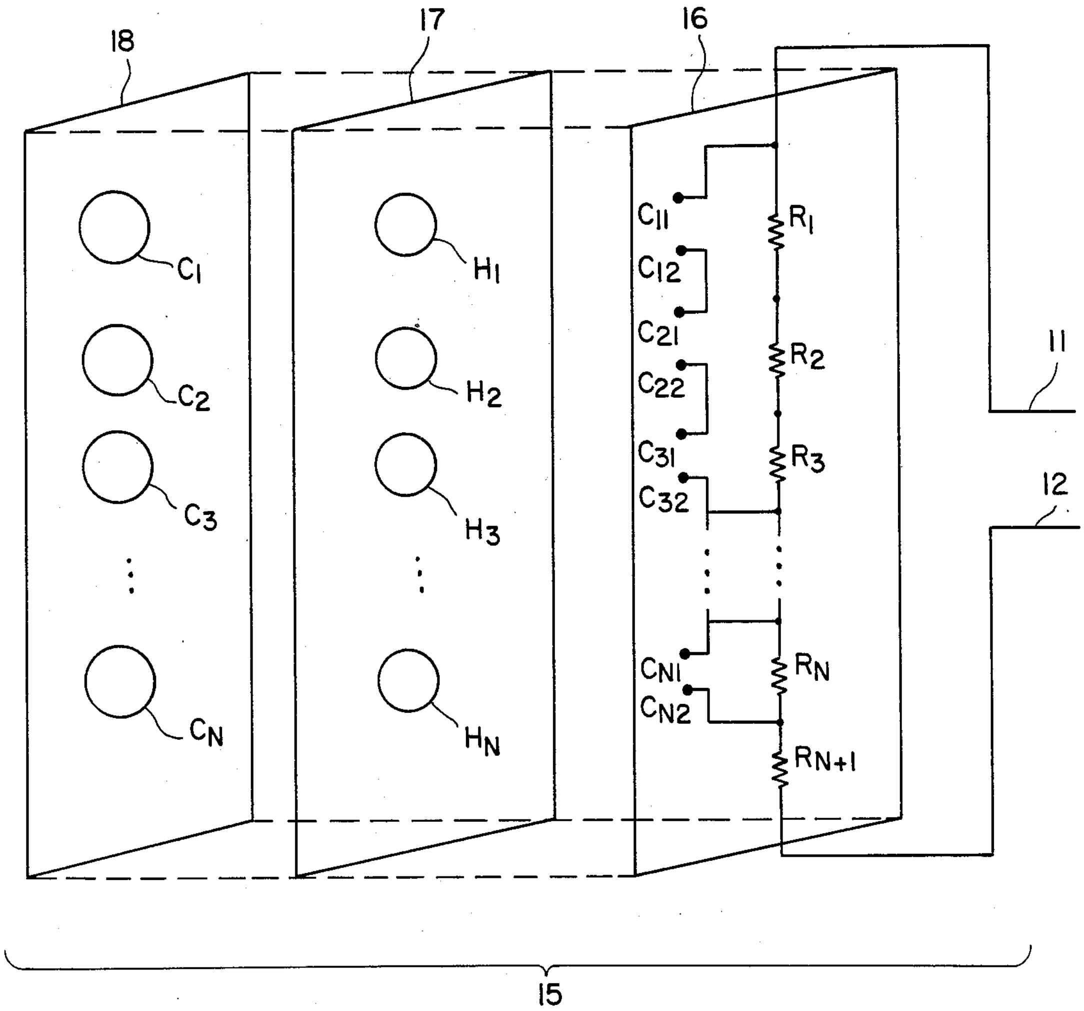
FIG. 3A is an exploded schematic view of a membrane keyboard suitable for use in a control apparatus according to the present invention.

Further advantages of the present invention are several; however, one which is particularly noteworthy is its easy implementation in many different low cost arrangements for implementing a keyboard. One suitable arrangement is to use a membrane keyboard 15 as shown in FIG. 3A. It is typical in this type of keyboard to use a screen process to deposit silver ink on the substrate sheet 16 to act as the conductors (shown by solid lines) to the silver ink switch contacts $C_{11}$ through $C_{N2}$. Typically movable contacts $C_1$–$C_N$ are provided on a flexible membrane 18, located over the contacts $C_{11}$ through $C_{N2}$ on the substrate sheet 16 so that, when pressed a contact $C_1$ will touch and connect contacts $C_{11}$ and $C_{12}$. Similarly, if contacts $C_1$–$C_N$ are pressed, their corresponding contacts $C_{21}$, $C_{22}$–$C_{N1}$, $C_{N2}$ will be closed. In typical switches of this type, a separator 17 has apertures or holes $H_1$–$H_N$ aligned with the contacts $C_1$–$C_N$. The same screening method used for the silver conductors can be used to deposit carbon ink in order to deposit "resistor" elements $R_1$–$R_N$ on the substrate sheet 16 shown in FIG. 3A. This process adds an additional screening stage which may add 1–3% to the cost of a keypad. This screening method of establishing resistor elements typically results in an absolute tolerance of about 12% from the nominal resistor value desired. In the present invention, this tolerance is not important as it is "calibrated" or "normalized" to $T_o$.

The relative tolerance in this resistor screening process is typically less than 5%, however, this tolerance is also a function of the physical position of the resistor elements so that if they are placed in close proximity to one another this tolerance can be reduced further still. The relative tolerance is also dependant on the absolute value of the resistor required as different carbon inks are used for different resistor magnitudes. Generally, the tightest tolerances can be had with lower resistor values.

Another arrangement is to build the keyboard using conventional switches mounted wherever convenient. Appropriate discrete resistors are mounted at the switch location. This allows quick and inexpensive retrofitting or redesign of existing systems to include the above described invention. Specifically, older electromechanical vending machines or electronic machines that require mechanical switches at certain locations can be rewired in the manner defined above and used in conjunction with an electronic control system including the present invention.

Yet another arrangement is to use printed circuit board mounted switches and a printed circuit board with discrete resistors, or DIP or SIP resistor packages (for tighter relative tolerances) mounted on the printed circuit board. This allows a very low cost vending machine keyboard to be made. An additional cost advantage can be achieved if the remainder of the control felectronics is mounted on the same printed circuit board. Existing vending selection switch decode schemes rule out this possibility especially those such as the 2 of N scheme described above. Because, in the 2 of N scheme, relatively expensive switches making several contacts simultaneously are required.

I claim:

1. A vending machine control apparatus for control of a vending machine, said control apparatus having an improved vendor selector switch detection and decoding apparatus comprising:

a plurality of vendor selection switches for selecting a product to be dispensed;

a plurality of impedances electrically connected to the plurality of vendor selector switches to form a keyboard network having at least one keyboard decode line which presents a unique keyboard impedance depending upon which switch of the plurality of vendor selector switches is closed;

a switch decode means for detecting and decoding a closure of at least one of the plurality of vendor selector switches, and for producing an output signal indicative of said closure on a switch decode line, said switch decode means having an input connected to the keyboard network by the keyboard decode line; and a logic control means for making a determination of which of the plurality of vendor selection switches has been closed from the output signal on he switch decode line of the switch decode means and for utilizing said determination of the overall control of the vending machine, said logic control means connected to the switch decode line of the switch decode means and to a plurality of vending machine means for controlling subfunctions of the vending machine.

2. The apparatus of claim 1 wherein the number of selector switches ($S, S_2, S_3 \ldots S_N$) is N, the number of impedances ($Z_1, Z_2, Z_3 \ldots Z_{N+1}$) is N+1, and the selector switches and impedances are electrically connected to form a keyboard network having an impedance ($Z_{keyboard}$) presented at the keyboard decode line when a switch $S_M$ is closed of $$Z_{keyboard} = \sum_{x=1}^{M} Z_x.$$

3. The apparatus of claim 2 wherein each of the selector switches is assigned a priority determined by its position in the keyboard network, and when multiple selector switches are simultaneously closed, the switch with the highest priority is automatically decoded by the switch decode means and the logic control means is programmed to cause the vending machine to function as if only the switch with the highest priority had been pressed.

4. The apparatus of claim 2 wherein each of the impedances $Z_1, Z_2, Z_3 \ldots Z_N$ is a resistor having the same nominal value.

5. The apparatus of any one of claims 1-4 wherein the switch decode means comprises an impedance to frequency converter whose output signal has a frequency indicative of the impedance at the input connected to the keyboard decode line.

6. The apparatus of claim 5 wherein the logic control means comprises a microprocessor and the switch decode means output signal is connected to a microprocessor input which measures the period of the switch decode means output signal.

7. The apparatus of claim 6 wherein the microprocessor stores the number of switches N and decodes a switch closure by first computing an all switches open period value $T_o$ when all the plurality of selector switches are open, then computing a step change period value $\Delta T$ by effectively dividing $T_o$ by N+1, saving $\Delta T$ in memory, and determining the switch which has been closed by comparing when the switch is closed the ratio of the period of the output signal from the decode means to $\Delta T$.

8. The apparatus of claim 1 wherein the logic control means further comprises means for determining if an illegal combination of vendor selection switches have been simultaneously closed.

9. The apparatus of claim 1 wherein in the keyboard network each of the plurality of vendor selection switches is connected in series with one of the plurality of impedances in a plurality of switch-impedance pairs, and the plurality of switch-impedance pairs are connected in parallel with a further impedance.

10. The apparatus of claim 1 wherein in the keyboard network each of the plurality of vendor selection switches is connected in parallel with a corresponding one of the plurality of impedances to form a plurality of switch-impedance pairs, and the plurality of switch-impedance pairs are connected together in series with a further impedance.

11. The apparatus of either claim 9 or claim 10 wherein the impedance value of each of the impedances is a selected different value so that each possible selection switch closure or combination of selection switch closures presents a unique keyboard impedance.

12. The apparatus of any one of claims 1, 2, 8, 9, or 10 further comprising a plurality of vending machine operation switches, and a second plurality of impedances electrically connected with the plurality of vending machine operation switches to form an operation switch network having at least one operation switch network decode line which presents a unique operation switch network impedance depending upon which switch of the plurality of operation switches is closed.

13. A method of detecting and decoding a closure of a vendor selection switch arranged in a network of selector switches and impedances electrically connected to form a keyboard network having at least one keyboard decode line which presents a unique keyboard impedance depending upon which switch is closed, in a vending machine including a microprocessor based control system comprising the steps of:

producing a signal having a period indicative of the unique keyboard impedance;

measuring an all switch open base period when all the selector switches in the network are open;

calculating a step change period value by effectively dividing the all switch open period by a value related to the unique keyboard impedance when all the selector switches in the network are open;

remeasuring the period of the signal after the closure of a vendor selection switch; and determining which vendor selection switch has been closed by comparing the period measured after closure with the step change period value.

14. A vending machine control apparatus for control of a vending machine, said control apparatus having an improved vendor selector switch detection and decoding apparatus comprising:

a plurality of vendor selection switches for selecting a product to be dispensed;

a plurality of resistors on a substrate sheet electrically connected by connectors to the plurality of vendor selector switches to form a membrane keyboard network having at least one keyboard decode line which presents a unique keyboard resistance depending upon which switch of the plurality of vendor selector switches is closed;

a switch decode means for detecting and decoding a closure of at least one of the plurality of vendor selector switches, and for producing an output signal indicative of said closure on a switch decode line, said switch decode means having an input connected to the keyboard network by the keyboard decode line; and a logic control means for making a determination of which of the plurality of vendor selection switches has been closed from the output signal on the switch decode line of the switch decode means and for utilizing said determination in the overall control of the vending machine, said logic control means connected to the switch decode line of the switch decode means and to a plurality of vending machine means for controlling subfunctions of the vending machine.

15. The apparatus of claim 14 wherein both the resistors and the connectors are deposited on the substrate sheet by a screening process, and the logic control means further operates to perform a calibration step which compensates for resistance tolerance values.

16. The method of claim 13 further comprising the steps of assigning each of the selection switches a priority and decoding a simultaneous operation of more than one selector switch as the operation of the selector switch with greatest priority.

17. The method of claim 13 wherein at least one multiple switch closure presents a recognizable impedance, and further comprising the step of recognizing said at least one multiple switch closure as a mode determining signal.

* * * * *

UNITED STATES PATENT AND TRADEMARK OFFICE
CERTIFICATE OF CORRECTION

PATENT NO. : 4,817,010

DATED : March 28, 1989

INVENTOR(S) : Dobbins

It is certified that error appears in the above-identified patent and that said Letters Patent is hereby corrected as shown below:

In the Specification:

Column 3, line 7, delete "or" and insert --Or--.

Column 3, line 48, delete "fapparatus" and insert --apparatus--.

Column 6, line 7 delete "fmultiple" and insert --multiple--.

Column 6, line 29 delete "emvironment" and insert --environment--.

Column 10, line 14 delete "$C_1$" following "contacts" and insert --$C_2$--.

Column 10, line 56 delete "felectronics" and insert --electronics--.

In the Claims:

Claim 1, column 11, line 16 delete "he" and insert --the--.

Claim 1, column 11, line 18 delete "of" and insert --in--.

Claim 2, column 11, line 24 delete "S" following "(" and insert --$S_1$--.

Signed and Sealed this

Fifteenth Day of January, 1991

*Attest:*

HARRY F. MANBECK, JR.

*Attesting Officer* *Commissioner of Patents and Trademarks*